United States Patent Office 3,615,143
Patented Oct. 26, 1971

3,615,143
PROFILE TESTING
John Denzil Barr, Oadby, Richard Edmund Reason, Market Harborough, Thomas Charles Reeve, London, Robert Claude Spragg, Leicester, Arthur Tisso Starr, New Barnet, Peter Frederic Thomas Cryer Stillwell, Aldershot, and David John Whitehouse, Melton Mowbray, England, assignors to The Rank Organisation Limited, London, England
Filed Apr. 4, 1969, Ser. No. 813,649
Claims priority, application Great Britain, Apr. 10, 1968, 17,260/68
Int. Cl. G01b 7/28, 7/34, 19/26
U.S. Cl. 33—174                              5 Claims

ABSTRACT OF THE DISCLOSURE

In testing the circumferential surface of an object relative rotation is effected at an angular velocity between the object and a detector device which provides signals representative of the surface characteristics of the object around a closed circumferential path. The signals are passed through a filter device which passes the constant component and one or more selected harmonic components of the signals in accordance with a reference shape for the object. The filter device according to the invention has an effective impulse response such that the sum of the ordinates of this impulse response at times $(t+2\pi r/\omega)$, $o<t\leq 2\pi/\omega$, following an impulse input at $t=o$, where $r=0, 1, 2, 3 \ldots$ is of the form:

$$(a_0+2 \cos (\omega t)+a_2 \cos (2\omega t)+ \ldots +a_m \cos (m\omega t))$$

where $a_0 \neq 2$ and $a_2 \ldots a_m$ individually have values of 2 or zero, and where the values of the ordinates of the impulse response are negligible for $r>3$. Preferably the impulse response has the form $(1+2 \cos \omega t)$ for $o<t\leq 2\pi/\omega$ and zero elsewhere.

---

This invention relates to the testing of the profile of a surface section of an object, more particularly by measuring deviations of the surface section with respect to a given reference shape in the form of a closed curve, for example a circle or an ellipse.

A common method for testing at least approximately round surface profiles of an object entails relatively rotating the object and a surface-following detector device about an accurately defined axis and recording the output of the detector device, conveniently in polar co-ordinates, over the complete angular range of relative rotation to produce a record of the surface profile.

The output signal from the detector device will have a cyclical repetition frequency of $\omega/2\pi$ where $\omega$ is the angular velocity of relative rotation, and in general the amplitude S of this signal at a time $t$ can be expressed as a Fourier series:

$$s = p_0 + p_1 \cos \omega t + p_2 \cos 2\omega t + \ldots$$
$$+ p_n \cos n\omega t + q_1 \sin \omega t + \ldots + q_n \sin n\omega t \ldots$$

where $p_0, p_1 \ldots p_n$ and $q_1$ are constants. The amplitudes $p_1$ and $q_1$ of the fundamental frequency component represent the eccentricity of the object with respect to the axis of relative rotation, while the harmonic components represent departures of the profile of the object from a true circle: for example the component at the second harmonic angular frequency $2\omega$ represents the elliptical component of the overall shape of the profile.

For many applications it is desirable to separate the constant component $(p_0)$ and the fundamental components from the detector signal in order to give a signal representative of the departure of the profile of the object from a true circular shape. Where the "reference shape" against which the profile of the object is compared is an ellipse, it is necessary to separate from the detector signal the second harmonic components also. The components to be separated from the signal to provide a profile measurement will be different for different reference shapes. A known method for effecting such separation is to pass the detector output signal through a low-pass filter device which passes only the constant and low-frequency components which it is desired to remove: the output of the filter device may then be subtracted from the detector signal at the input to the filter device to give a signal having only the required harmonic components.

A difficulty arises when this selective filtering technique is applied to an electrical detector output signal, due to the fact that conventional electrical filter devices have relatively long response times, that is, they require a relatively long time for the initial transients to die away when an input signal is applied thereto. A result of this is that when such a filter device is used to filter the cyclically repeating detector signals arising from relative rotation of an object and a detector device, several complete cycles are necessary before the filter device exactly repeats its output signal on each revolution. The use of known electrical filter devices in this way is therefore time-consuming and unsuited to the satisfactory testing of objects produced in large quantities.

According to one aspect of the present invention there is provided a filter device having a linear characteristic for passing harmonic frequencies up to the $m$th harmonic of an angular frequency $\omega$, and having an effective impulse response such that the sum of the ordinates of this impulse response at times $$\left(t+\frac{2\pi r}{\omega}\right)$$

$o \leq t < 2\pi/\omega$, following an impulse input at $t=o$, where $r=0, 1, 2, 3$, is of the form:

$$a_0+2 \cos \omega t + a_2 \cos 2\omega t + \ldots a_m \cos m\omega t$$

where $a_0$ is a constant not equal to 2, $a_2 \ldots a_m$ individually have values of either 2 or zero, and where the values of the ordinates of the impulse response for $r>3$ are negligible.

The filter device according to the invention does not require a long time to settle down.

More specifically, by selecting an impulse response summing to the form $1+2 \cos \omega t$, a filter device can be designal according to the invention for selectively extracting constant and fundamental components of cyclically repetitive signals of different types. The filter device is particularly suitable for extracting such components from signals derived from surface detector devices used for testing circumferential surfaces of objects such as, for example, work pieces, either for eccentricity of mounting with respect to a rotational axis, or for irregularity with respect to a reference shape.

According to a further aspect of this invention there is provided a method of testing a circumferential surface of an object in which relative rotation is effected at an angular velocity $\omega$ between the object and a detector device which provides signals representative of the surface characteristics of the object around a closed circumferential path, the said signals being passed through a filter device which is effective to pass the constant component and one or more selected harmonic components of the signals in accordance with a reference shape for the object, the filter device having an effective impulse response such that the sum of the amplitudes of the output of the filter device at times $$\left(t+\frac{2\pi r}{\omega}\right)$$

$o \leqslant t$ $2\pi/\omega$, following an impulse input at $t=o$, where $r$ is an integer having successive values 0, 1, 2 and 3 for successive respective times, is of the form:

$$a_0 + a_1 \cos \omega t + a_2 \cos 2\omega t + \ldots + a_m \cos mt$$

where $r=0, 1, 2, 3 \ldots a_0, a_1$ are constants, and $a_2 \ldots a_m$ have selected constants values or are zero. The value of the ordinates of the impulse response is substantially zero for large values of $r$, that is, values of $r$ greater than 3.

When testing the surface of the object for irregularity, either on a small scale (i.e. surface roughness) or on a larger scale (i.e. surface curvature error) the filter device may be employed to extract from the original surface signal the constant component and any desired combination of harmonic components. The output of the filter device may then be combined algebraically with the original signal (or input to the filter device) to provide a second signal representative of the deviations of the surface shape from a reference shape. Thus if the impulse response of the filter devices is chosen to sum to $1+2 \cos \omega t$, the second signal can be representative of the deviations of the measured surface from a true circle, whilst if the impulse response of the filter device is chosen to sum to $1+2 \cos \omega t + 2 \cos 2\omega t$ the second signal can be representative of the deviations of the measured surface from a true elliptical form.

Where the reference shape is circular, as for example when testing a cylindrical workpiece, the filter device will be adapted to pass only the constant and fundamental components of the input signal. Consequently the ordinates of the impulse response at time $$\left(t+\frac{2\pi r}{\omega}\right)$$

$o \leq t < 2\pi/\omega$, must sum to $1+2 \cos \omega t$. The ordinates require to be zero for all except small values of $r$. Indeed, according to a preferred embodiment of the invention the output amplitude of the impulse response of the filter is zero for $t \leq o$ and for $t > 2\pi/\omega$, and has the response $1+2 \cos \omega t$ between $t=o$ and $t=2\pi/\omega$. When this embodiment of the filter device is used in the method of testing referred to above, the filter device settles in a minimum time undisturbed by transients and the signal derived from the filter device is correct after only one complete cycle of relative rotation.

According to one embodiment of the invention the filter device includes an analogue to digital converter in combination with an $n$-stage digital store or shift register effective to sample an input signal at regular intervals determined by a train of clock pulses at a repetition frequency of $n\omega/2\pi$, each sample input value being converted into a digital signal which is stored in the digital store or shift register until $n$ clock pulses have occurred, when the contents of each of the $n$ stages of the store are passed automatically to a respective digital-to-analogue converter adapted to provide an analogue signal, means for modifying each respective analogue signal by a respective weighting factor $f_1, f_2, f_3 \ldots f_n$ proportional to $(1+2 \cos \theta)$ where $\theta = 0, 2\pi/n$, $$2 \times 2\pi/n \ldots \left(\frac{n-1}{n}\right)2\pi$$

respectively, and summing means effective to sum said modified analogue signals to provide an output signal.

Said analogue signals preferably comprise respective electrical voltages and said means for modifying the respective analogue signals preferably comprise respective resistance $R_1 R_2 \ldots R_n$ the magnitudes of which are chosen inversely proportional to $(1+2 \cos \theta)$ such that for $R_1 R_2 \ldots R_n$, $\theta = 0, 2\pi/n$, $$2 \times 2\pi/n \ldots \left(\frac{n-1}{n}\right)2\pi$$

respectively.

Preferably the summing means comprise an amplifier having negative feedback means which may be adjusted to give unity gain for a direct current input to the filter device. For those values of $(1+2 \cos \theta)$ which are negative respective resistance having magnitudes inversely proportional to the magnitude of $(1+2 \cos \theta)$ may be used and the currents passed there through summed in a further summing amplifier, which introduces a change of sign, and the output of said further summing amplifier may then be coupled to the input of the first summing amplifier via a further resistance chosen to maintain unity gain.

In yet a further embodiment of the invention the filter device includes an $n$-stage delay unit through successive stages of which the filter input signal passes with a total delay of $2\pi/\omega$, respective delayed signals being taken from each delay stage, and applied as inputs to summing means such as a summing amplifier after modification by a respective weighting factor $f_1, f_2, f_3 \ldots f_n$ proportional to $1+2 \cos (\theta - \alpha)$ where $\theta = 0, 2\pi/n$, $$2 \times 2\pi/n \ldots \left(\frac{n-1}{n}\right)2\pi$$

respectively, and $\alpha$ is a selected phase angle, for example the phase delay of the fundamental frequency for a further filter of conventional design combined with said delay unit.

The invention further comprehends apparatus for testing a circumferential surface of an object, including means for relatively rotating a detector device and the object, the detector device being adapted to provide signals representative of positions relative to the detector device of successive portions of the surface of the object around a closed circumferential path thereon, a filter device through which said signals are passed to provide output signals comprising the constant components and one or more selected low harmonic components, and means utilising said output signals to provide an indication of the deviations of the shape of the object from a reference shape, or to provide an indication of the eccentricity of the mounting of the object with respect to the axis of relative rotation of the object and the detector device, the filter device having an impulse response such that the sum of the amplitudes of the output of the filter device at times $t + 2\pi r/\omega$, $o \leqslant t < 2\pi/\omega$, following an impulse input, where $r=0, 1, 2 \ldots$ is of the form: $a_0 + a_1 \cos \omega t + a_2 \cos 2\omega t \ldots a_m \cos m\omega t$, where $a_0, a_1$ are selected constants and $a_2 \ldots a_m$ have selected values or are zero, and where $\omega$ is the angular speed of relative rotation, the amplitudes of the impulse response for other than small values of $r$ being zero.

The filter device preferably includes an $n$-stage store or shift register effective to sample and store said signals from the detector device at regular intervals determined by a train of clock pulses at a repetition frequency of $n\omega/2\pi$, means effective when $n$ clock pulses have occurred to provide a respective analogue signal from each of the $n$ stages of the store and means effective to modify each analogue signal by a weighting factor $f_1, f_2 \ldots f_n$ proportional to the desired impulse response (e.g. proportional to $1+2 \cos \theta = \ldots +2 \cos m\theta$, where $\theta = 0$, $2\pi/n$, $$2 \times 2\pi/n \ldots \left(\frac{n-1}{n}\right)2\pi$$

and means for summing said modified analogue signals to provide the filter output signals.

Alternatively, or in addition, the filter device may include first and second means effective to modify each analogue signal by respective weighting factors $f_1$, $f_2$, $f_3 \ldots f_n$ proportional to $\cos \theta$ and $\sin \theta$ respectively, where $\theta = 0$, $2\pi/n$, $2 \times 2\pi/n \ldots (n-1)2\pi/n$ respectively, and respective summing means effective to sum the respective modified anologue signals to provide two respecting outputs representative of the eccentricity of the mounting of the object relative to the axis of relative rotation. Respective servo means responsive to said two respective outputs of the filter device may be provided to adjust the position of the object relative to the said axis in a sense to reduce the eccentricity of the object with respect to said axis.

Some preferred embodiments of the invention will be described, by way of example, with reference to the accompanying drawings, in which.

Figure 1:
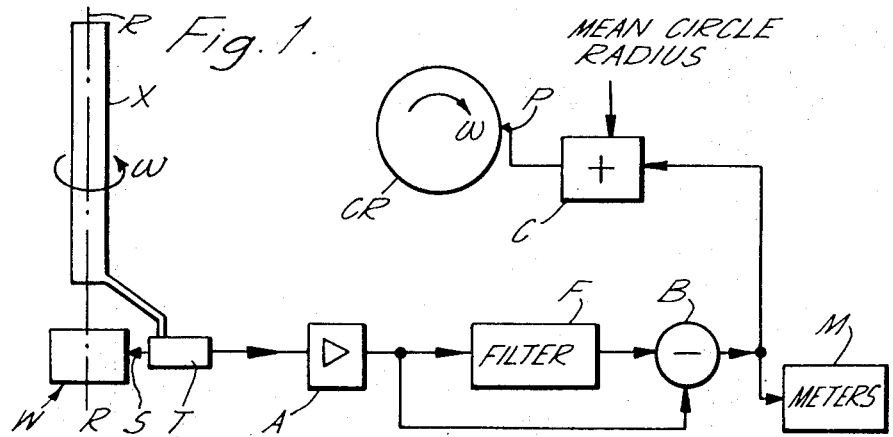
FIG. 1 illustrates diagrammatically an arrangement for testing the surface shape of a workpiece by the method according to the invention.

FIG. 1 shows diagrammatically an instrument for measuring and indicating "roundness error" in a nominally cylindrical workpiece W, that is to say, deviations in the shape of any sectional profile of the workpiece from a true circle. A surface following stylus S is mounted for rotation about the axis R—R of an accurately cylindrical and concentrically mounted spindle X which is rotated at a constant angular velocity $\omega$ to move the stylus S around the workpiece W. The stylus S forms part of a surface detector device including a transducer T. The stylus S is maintained in contact with the surface of the workpiece W, the latter being held in a fixed position. The transducer T, of any convenient type, provides an electrical signal, herein referred to as the surface signal, $s$, the amplitude of which at any instant is directly proportional to the distance between the transducer T and the surface of the workpiece W contacted by the stylus S, in other words, proportional to the instantaneous displacement of the stylus S as the latter rotates about the workpiece W.

The surface signal $s$ from the transducer T is amplified in an amplifier A and then passed to a filter device F. The filter device F passes only the direct current component and the component at the fundamental frequency $(\omega/2\pi)$ of the surface signal $s$. The output signal from the filter F is subtracted in a circuit B from the amplifier input signal to the filter F (i.e. the complete surface signal $s$) to provide a signal containing only the harmonics, without the constant and fundamental components. This signal is utilised to drive suitable meters M which measure quantitatively the curvative error of the workpiece W. The signal is also passed to an addition circuit C where it is combined with a reference signal representative of the reference shape of the workpiece, in this case a reference circle. The combined signal causes deflection of a pen P on a chart recorder CR which is driven in sympathy with the spindle X at the angular velocity $\omega$. The reference signal causes the pen P to draw a reference circle on the chart recorder CR, and in use of the instrument the output from the subtraction circuit B is disconnected from the meters M and from the addition circuit C for one complete revolution of the spindle X, using, for example, a relay-controlled switch in the circuit, so that during this revolution the chart recorder CR records only the reference circle. During a second revolution the output from the subtraction circuit B is connected to both the meters M and to the addition circuit C so that the detected profile of the workpiece W is superimposed on the reference circle, with an enlarged radial scale, so that errors in the roundness of the workpiece can be assessed.

The initial deflection of the pen P on the chart recorder CR can, alternatively, be derived mechanically.

It is desirable that the recording of the workpiece profile take place in the minimum number of revolutions of the spindle X and is preferably complete at the end of the second revolution. The time taken depends upon the impulse response of the filter device F. The impulse response of a filter is the variation with time of the amplitude of the output from the filter following the application of an impulse thereto. The ideal impulse response for a filter which, as in this example, is designed to extract the direct current and fundamental components from a cyclically repeating surface signal can be derived by considering the form of the signal derived from a workpiece having a perfectly circular profile with a single excrescence of amplitude E and very small angular extent $2\pi K$, and remembering that any actual profile can be considered as the superposition of a very large number of adjacent excrescences of varying amplitudes upon a perfectly circular form.

The signal $s$ at a time $t$ following the detection of the excrescence is given by the expression:

$$s = A + KE\left(1 + \frac{2 \sin K\pi}{K\pi} \cos \omega t + \frac{2 \sin 2K\pi}{2K\pi} \cos 2\omega t + \ldots \frac{2 \sin nK\pi}{nK\pi} \cos n\omega t\right)$$

$$K \ll 1 \quad \frac{\sin K\pi}{K\pi} = 1$$

and the direct current and fundamental components of the signal may be written:

$$s_\mathrm{F} = A + KE\,(1 + 2\cos \omega t) \ldots \quad (1)$$

A is a direct current component, representing a radius, and $KE(1 + 2\cos \omega t)$ are the direct current and fundamental terms deriving from the excrescence. In the actual surface signal obtained from a cylindrical workpiece the direct current and fundamental components arise solely from the size and the eccentricity of the mounting of the workpiece with respect to the axis of rotation, and it is required that the filter device F should extract these components so that the output from the subtraction circuit B may represent solely the departure of the workpiece from a circular profile, that is, the roundness error of the workpiece. The filter device must therefore have unity response to a direct current input, and its impulse response should ideally be of the form $(1 + 2 \cos \omega t)$. Moreover, since the signal obtained from the workpiece is repetitive at a frequency $\omega/2\pi$, the impulse response should have this form over one complete period of rotation only, that is, it should be zero for $$0 \geq t > \frac{2\pi}{\omega}$$

Figure 4:
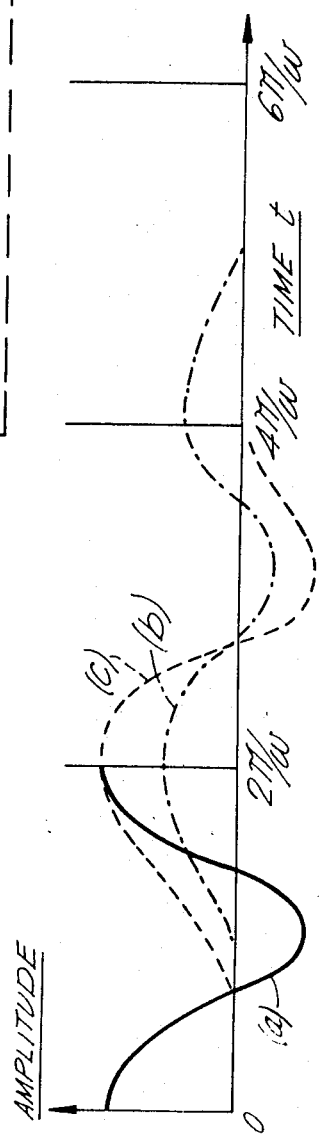
FIG. 4 is a graphical representation of the impulse response of a filter device according to a preferred embodiment of the invention.
Figure 5:
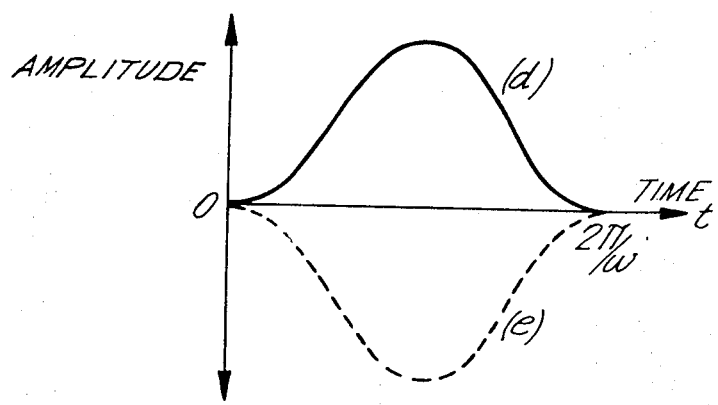
FIG. 5 is a graphical representation of the impulse response of another type of filter device in accordance with the invention.

This ideal form of impulse response is shown graphically in FIG. 4 by the full line $(a)$.

With an impulse response of this form the filter device will extract the direct current and fundamental components from the surface signal in a minimum time and without transients. After one complete revolution of the workpiece the output from the filter will be the direct current and fundamental components of the repetitive signal representing the profile. The "settling time" for the filter device F is much reduced compared with that of conventional filters.

Figure 2:
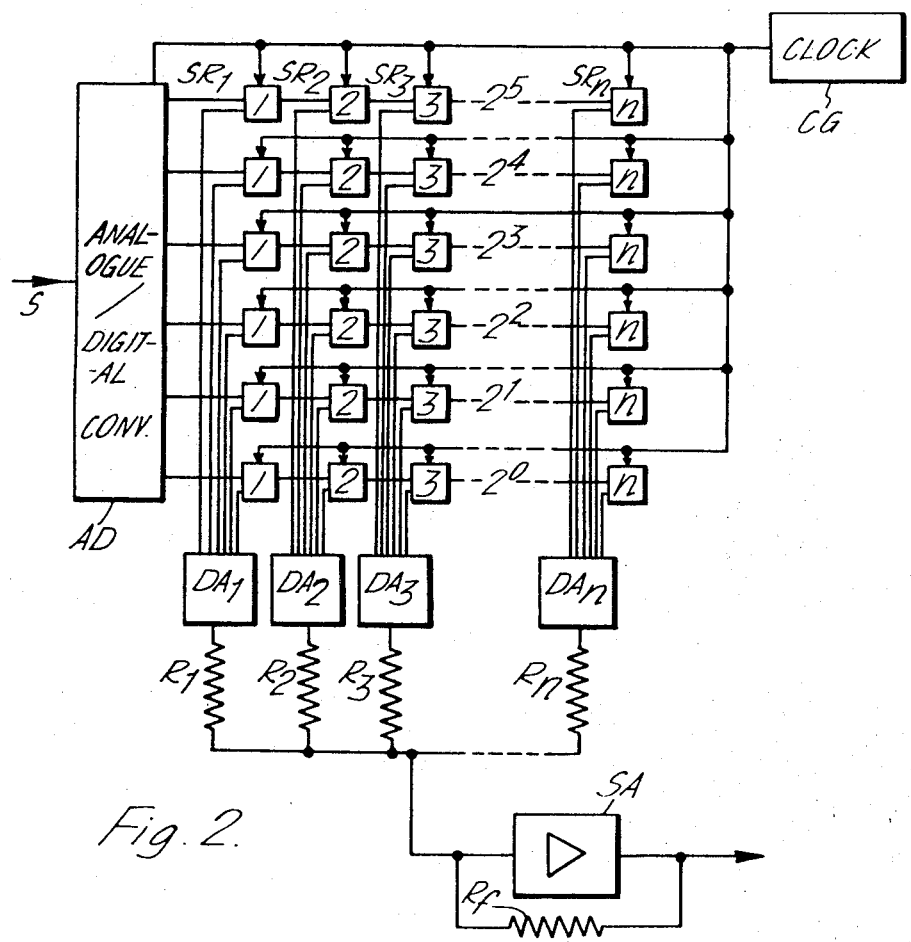
FIG. 2 is a schematic diagram of a filter device according to one embodiment of the invention.

One embodiment of a filter device F in which the required impulse response can be realised is shown schematically in FIG. 2. This embodiment utilises digital storage of the surface signal over one complete cycle. The surface signal $s$ from the transducer T is sampled at regular intervals determined by a train of clock pulses derived from a pulse generator CG. The clock pulse repetition frequency is $n\omega/2\pi$, where $n$ is a large integer, so that $n$ samples of the signal $s$ are taken in one complete revolution of the stylus S. The sampled signals are converted into digital form by an analogue-to-digital converter AD, the digital output of which is applied on a plurality of output lines to respective input stages $SR_1$ of an $n$-stage parallel shift register constituting a digital store. A separate output line from the converter AD is provided for each successive digital order, in this example six lines are provided, corresponding to the binary orders $2^0$ to $2^5$ respectively, but in practice eight or more lines would be used. The clock pulses are applied to the $n$ stages of the shift register $SR_1$–$SR_n$ and to the converter AD, so that on the occurrence of each clock pulse the contents of each stage of the shift register are transferred to the next higher stage (that is, to the right as represented in FIG. 2) and at the same time the output of the converter AD is passed to the first stage $SR_1$. Thus at the end of one complete revolution of the stylus S around the workpiece W the $n$ stages of the shift register $SR_1$–$SR_n$ contain a complete digital representation of the surface signal $s$ in the form of $n$ discrete samples taken at equal intervals $2\pi/n\omega$.

At the $n$th clock pulse, that is, after one complete revolution of the stylus S, the contents of each register stage $SR_1$–$SR_n$ are fed to respective digital-to-analogue converters $DA_1$–$DA_n$. The outputs of the converters $DA_1$–$DA_n$ will comprise $n$ analogue currents representative of the surface signal amplitude at successive intervals of $2\pi/n\omega$. These currents are fed into a summing amplifier SA via respective resistances $R_1$–$R_n$. The magnitudes of the resistances $R_1$–$R_n$ are chosen so as to "weight" the respective analogue currents by different respective factors relative to each other to give the desired impulse response as the overall weighting function for the summation signal at the output of the amplifier SA. To provide an impulse response of the form $(1+2 \cos \omega t)$ the magnitudes of the resistances are chosen to be proportional to $(1+2 \cos \theta)$, such that for $R_1, R_2, R_3 \ldots R_n$, $\theta=0$, $2\pi/n$, $2\times 2\pi/n \ldots (n-1)2\pi/n$ respectively.

The output of the filter device comprises the output of the summing amplifier SA. In order to give the filter device unity response for the D.C. component of the summing amplifier SA is provided with negative feedback, represented by a feedback resistance $R_f$, which is adjusted to give a gain of unity for direct current. The amplifier SA introduces a phase shift of $\pi$, so that in fact the amplifier output in this embodiment will be proportional to $-(1+2 \cos \omega t)$. When using this filter device in the arrangement of FIG. 1, therefore, the subtraction circuit B would be replaced by an addition circuit, the output of which will then be the second and higher harmonics only of the surface signal.

Some of the resistances $R_1$–$R_n$ proportional to $(1+2 \cos \theta)$ would have negative values. For these values the respective analogue signals from the respective converters $DA_1$ are inverted and then passed through resistances having magnitudes in accordance with the modulus of $(1+2 \cos \theta)$ before application to the summing amplifier. Alternatively, the analogue signals may be passed through such resistances without inversion, the currents flowing through these resistances being summed in a further summing amplifier. The output of this further summing amplifier is then applied through an appropriate resistance as one of the inputs to the first summing amplifier SA, the required inversion having been effected in said further summing amplifier.

For satisfactory application in an instrument such as that of FIG. 1 the number of stages $n$ of the digital shift register $SR_1$–$SR_n$ must be sufficiently large to ensure that all surface excrescences on the workpiece W are sampled. Alternatively smoothing must be applied to the signal before it is fed into the analogue-to-digital converter AD, such smoothing being such that it does not introduce phase shift. Alternatively, if some phase shift is introduced due to a delay inherent in the smoothing, this must be compensated by adjusting the weightings introduced by the resistances $R_1$–$R_n$ so that the filtered fundamental component has the proper phase relationship to the unfiltered signal. In this case the accuracy of the roundness testing instrument incorporating the filter device depends to some extent on accurate maintenance of the designed speed of rotation of the spindle X.

Figure 3:
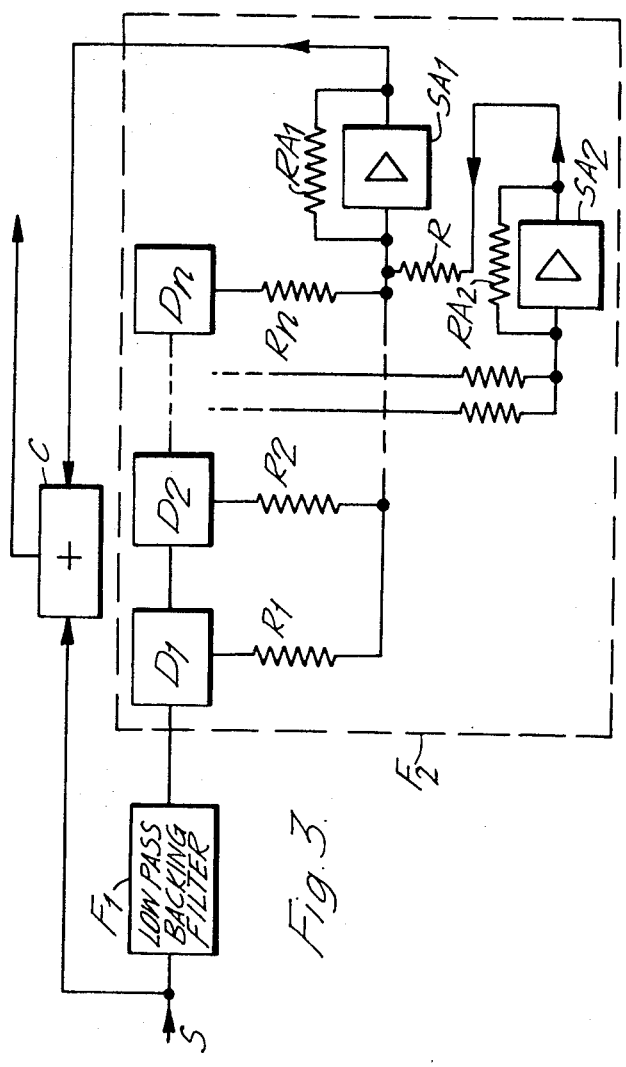
FIG. 3 is a schematic diagram of a filter device according to another embodiment of the invention.

FIG. 3 shows an analogue, as opposed to a digital embodiment of the invention. The filter device is a combination of a conventional low-pass backing filter $F_1$ and a transversal filter $F_2$. The input signal from the transducer T is passed through the filter $F_1$ to remove the higher harmonics which could otherwise be distorted in passing through the filter $F_2$. $F_2$ comprises $n$ delay stages $D_1$–$D_n$ in cascade so that the signal passes through the stages $D_1$–$D_n$ successively. Respective taps are taken through respective resistances $R_6$–$R_n$ from each respective delay stage $D_1$–$D_n$ to summing amplifiers $SA_1$ or $SA_2$ according to whether the expression $(1+2 \cos (\theta-\alpha))$ is positive or negative respectively, where, as in the previously described embodiment $$\theta_n = \left(\frac{n-1}{n}\right)2\pi$$

for the resistance $R_n$, and where $\alpha$ is the fundamental frequency phase delay in the filter $F_1$. The output of the summing amplifier $SA_2$ is passed to the input of the summing amplifier $SA_1$ via a resistance R.

The filter $F_1$ preferably has a low-pass characteristic such that the direct current and fundamental frequency of S is passed undisturbed, whilst higher harmonics are attenuated. The delay stages $D_1$–$D_n$ are designed so that they have a linear phase characteristic up to a frequency at which the filter $F_1$ has substantially zero transmission. The total time delay introduced by the $n$ delay stages $D_1$–$D_n$ is preferably arranged to be exactly equal to the time $(2\pi/\omega)$ taken for one complete revolution of the stylus S about the workpiece W. At high frequencies the delay stages D could comprise sections of delay line but at the low frequencies normally used for roundness measurements each delay section is conveniently formed from an active RC filter. Suitable stages are described by Bloodworth and Nesbitt in I.E.E.E. transactions vol. LM, No. 2, June 1967, and by Holt and Gray in Proc. I.E.E., December 1967, vol. 114, No. 12, p. 1871.

In both the embodiments described above with reference to FIGS. 2 and 3 the relative "weighting" of the resistances $R_1$–$R_n$ has been arranged to give an impulse response of the form $(1+2 \cos \omega t)$ for extraction by the filter device of the D.C. and fundamental components. By an extension of this principle the filter device can be designed to extract further harmonics of the input surface signal. For example if, in the two embodiments described above a further set of resistors $R_{n+1}, R_{n+2} \ldots R_{n+n}$ is provided, feeding into a respective summing amplifier, and their relative magnitudes "weighted" so as to be proportional to $(1+2 \cos (\theta-\alpha_1)+2 \cos (2\theta-\alpha_2))$, where $\theta=0, 2\pi/n \ldots (n-1) 2\pi/n$ for $R_{n+1}, R_{n+2}$ and $R_{n+n}$ respectively, then the output of the respective summing amplifier will include the direct current, fundamental and second harmonic components. In this case, $\alpha_1$ represents the phase delay of the fundamental and $\alpha_2$ the total phase delay of the second harmonic due to the backing filter, if provided. In the absence of a backing filter both $\alpha_1$ and $\alpha_2$ would be zero. When this filter device is used in the context of a surface profile testing instrument such as that of FIG. 1, the second harmonic components of the signal from the transducer T represents an elliptical contribution to the workpiece profile, and the extraction of this component by the filter device F would have the effect of referring the measurements made by the meters M and the chart recorder CR to a reference ellipse, and deviations from this reference ellipse would be measured. Similarly, deviations with reference to a trilobe shape can be measured by using the filter device to extract in addition the thrid harmonic of the surface signal.

In principle the filter device F can be designed to extract from the surface signal all harmonics up to, say, the $m$th harmonic, in which case the weighting factors (determined by the resistances $R_1$–$R_n$) would be chosen so as to be proportional to: $1+2 \cos (\theta-\alpha_1)+ \ldots +2 \cos (m\theta-\alpha m)$, where $\alpha_1 \ldots \alpha_m$ are respective phase delays from the backing filter $F_1$, if provided. The design of a filter device for this purpose necessitates storage or delay stages which maintain constant phase relations between all the harmonics up to the $m$th, as otherwise perfect cancellation cannot be achieved whent he filtered signal is combined with the unfiltered signal—for example in the circuit B of FIG. 1.

With the filter devices described above, the measurement of the workpiece shape can be made in the minimum time, that is, in one complete revolution of the stylus S. by providing the overall filter device with an impulse response of the form $1+2 (\cos (\omega t)$, curve ($a$) in FIG. 4. If it is not essential that the measurement be completed in this minimum time other shapes of the impulse response curve, which do not have the sharp discontinuities of the curve ($a$), may be used, making use of the fact that, for the intended measurements, the input to the filter device is cylically repetitive at intervals of $2\pi/\omega$. In the case of a filter having the impulse response ($a$) which receives impulse inputs at intervals of $2\pi/\omega$, the filter output would be a continuous curve of the form $1+2 \cos (\omega t)$; the same output, and, therefore, the same impulse response, would be obtained if each response curve extended over more than one complete cycle, provided the sum of the amplitudes (i.e. the ordinates in FIG. 4) at times $t, t+2\pi/\omega, t+2\times 2\pi/\omega \ldots t+2\pi r/\omega$ is equal to $1+2 \cos (\omega t)$. Two examples of impulse response fulfilling this condition are illustrated in FIG. 4 by curves ($b$) and ($c$): curve ($b$) extends over a time interval of $5\pi/\omega$, so that a filter having this impulse response would require 2½ rotation of the stylus before a measurement was complete, while curve ($c$) extends over a time interval of $4\pi/\omega$, requiring two rotations to complete a measurement. Neither of the impulse response curves ($b$) or ($c$) has sharp transitions.

It will be appreciated that the required impulse response for filters designed to extract further harmonics may be derived in the same way for a cylically repeating signal by making use of this superposing principle. In the most general case of a filter device designed to extract harmonics up to and including the $m$th the sum of the amplitudes at times $$t+\frac{2\pi r}{\omega}$$

($0 \leqslant t < 2\pi/\omega$), following an impulse input where $r=0, 1, 2 \ldots$ is of the form:

$$A+B \cos \omega t+C \cos 2\omega t \ldots +Z \cos m\omega t$$

where A is a selected constant if the direct-current term is to be extracted, and the coefficients B, C . . . Z of the respective harmonics are equal to either 2A or zero, the former if these respective harmonics are to be extracted.

Figure 7:
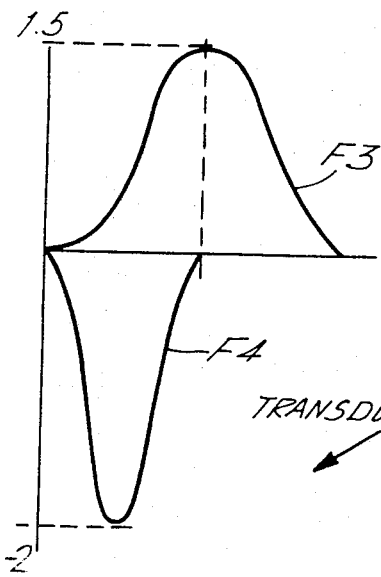
FIG. 7 is a graphical representation of the impulse responses of the two filters employed in FIG. 6.
Figure 6:
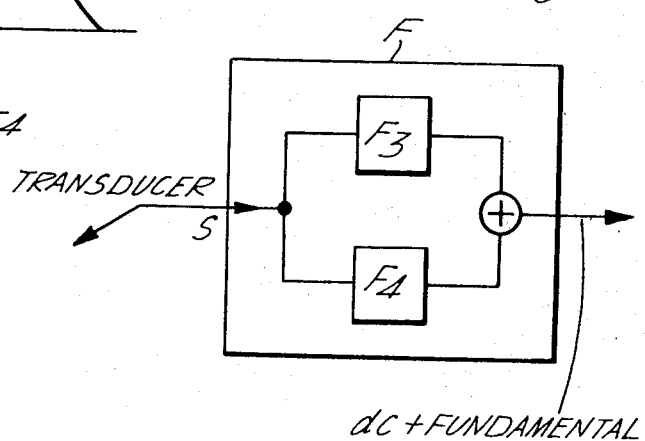
FIG. 6 illustrates the combination of two conventional low-pass filters arranged according to the invention.

Yet another embodiment of the invention is illustrated in FIG. 6. In this example the filter F consists of a parallel combination of filters $F_3$ and $F_4$. The filter impulse responses are shown in FIG. 7 and these are chosen to extract the d.c. and fundamental frequency components from a repetitive waveform of angular frequency $\omega$.

$F_3$ and $F_4$ may for example be constructed upon the principles disclosed in Proc. I.E.E., vol. 112, No. 4, April 1965, pp. 661–668 (Storey and Cullyer). $F_3$ is arranged so that after two complete revolutions of the stylus it delivers an output proportional to the direct current component of the signal $s$. The filter $F_4$ after a single revolution delivers an output consisting of a combination of the d.c. component and a sinusoidal component in synchronism and in proportion to the fundamental frequency of $s$. If the scale factors of $F_3$ and $F_4$ are made equal to the ratio 3:—4 it can readily be seen that the ordinates of the combined impulse response at times $$\left(t+\frac{2\pi r}{\omega}\right)$$

($o < t \leqslant 2\pi/\omega$) sum to $1+2 \cos \omega t$ which is the required condition.

The filter device according to the invention has been described with particular reference to its application to a profile-testing instrument. For example the signals extracted by the filter device may be used to indicate and/or control the eccentricity of the mounting of an object on a rotary spindle. This is facilitated in the case of the two filter devices described with reference to FIGS. 2 and 3 by the fact that the filtered signal components are stored.

For example, the filter devices of FIGS. 2 and 3 may be modified by the addition of two further sets of resistances $R_1$–$R_n$ proportional to $\sin \theta$ and $\cos \theta$ respectively, where $\theta$ has the same values for the resistances of each set as defined previously. The analogue currents derived from the two sets of resistances are summed in respective summing amplifiers. After one complete revolution of the object under test, or of a detector device rotating around the object, the data stored in the filter device will represent at least the low frequency components of the complete profile and if during second or subsequent revolutions the output of the $\cos \theta$—filter is sampled at $\theta=0$ and the output of the $\sin \theta$ filter at $\theta=\pi/2$ the two respective outputs so sampled will represent the cartesian coordinates of the error in alignment of the object under test and the axis of rotation, that is to say the eccentricity of the mounting of the object in magnitude and sign.

The two outputs representing the eccentricity could, for example, be employed in a suitable servo system to drive motors controlling the position of the object, or a table on which the object is mounted, so as to eliminate the detected eccentricity. In the context of a roundness measuring instrument this arrangement may be used to centre an object such as a workpiece automatically with respect to the axis of relative rotation of the detector device and the workpiece. A monitoring circuit may be provided for providing an indication when the mounting eccentricity or centering error has reached acceptable limits. This circuit may initiate the operation of the roundness measuring instrument automatically when the eccentricity is within said limits.

What is claimed is:

1. A method of testing the profile of a circumferential surface of an object against a reference shape, comprising effecting relative rotation at an angular velocity $w$ between the object and a detector device inducing an electro-mechanical transducer which provides electric signals representative of the surface profile of the object under test around a closed circumferential path, and passing the said signals through an electric filter device the output of which comprises substantially the constant component and one or more harmonic components of said electric signals selected according to the nature of the reference shape, said filter device having an effective impulse response, given by the sum of the amplitude of the output of the filter device occurring at successive times $(t+2\pi r/w)$ following an impulse input at $t=0$, where $r=0, 1, 2$ and 3 respectively, in substantially the form:

$$(a_0+2a_0 \cos (wt)+a_2 \cos (2wt)+ \ldots +a_m \cos (mwt))$$

where $a_0$, is a constant and $a_2 \ldots a_m$ have selected constant values or are zero, and where the value of the impulse response for $r>3$ is substantially zero.

2. Method as claimed in claim 1, in which the output of the filter device is combined algebraically with said electric signals representative of the surface profile of the object under test to provide signals representative only of deviations between the reference shape and the surface profile of the object, the constants $a_2 \ldots a_m$ being equal to either $2a_0$ or zero according to the nature of the reference shape.

3. Apparatus for testing the profile of a circumferential surface of an object against a reference shape, comprising: a detector device, means relatively rotating the detector device and the object, the detector device including a surface sensor cooperating with the surface of the object and an electro-mechanical transducer connected to the sensor and providing a cylically varying electric signal representative of the surface profile of the object around a closed circumferential path thereon, an electric filter device through which said electric signal passes to provide an output signal comprising the constant component of the said electric signal and one or more components at harmonics of the cyclic frequency of the said electric signal selected according to the nature of the reference shape, and means algebraically adding said electric signal representative of the surface profile of the object and said output signal to provide an indication of deviations of the shape of the object from the reference shape, said electric filter device having an effective impulse response such that the sum of the amplitudes of said output signal from the filter device occurring at successive times $(t+2\pi r/w)$, $o < t \leqslant 2\pi/w$, following an impulse input at $t=0$, where $r = 0, 1, 2$ and 3 respectively is substantially of the form:

$$(a_0 + 2a_0 \cos t + a_2 \cos 2wt + \ldots + a_m \cos wt)$$

where $a_0$ is a selected constant and $a_2 \ldots a_m$ have selected values or are zero, and $w$ is the angular velocity of relative rotation, the amplitudes of the impulse response for $r>3$ being substantially zero.

4. Apparatus as claimed in claim 3, in which the electric filter device includes a source providing electric clock pulses at a repetition frequency of $nw/2\pi$, an $n$-stage storage register effective to sample and store said electric signals from the detector device at regular intervals determined by the clock pulses, means effective when $n$ clock pulses have occurred to provide a respective analogue electric signal from each of the $n$ stages of the storage register, and means effective to modify the amplitude of each said analogue signals by a respective weighting factor $f_1, f_2, f_3 \ldots f_n$ proportional to the desired impulse response, and means summing said modified analogue electric signals to provide the filter output signals.

5. Apparatus as claimed in claim 3, in which the electric filter device includes a source providing electric clock pulses at a repetition frequency of $nw/2\pi$, an $n$-stage storage register effective to sample and store said electric signals from the detector device at regular intervals determined by the clock pulses, means effective when $n$ clock pulses have occurred to provide a respective analogue electric signal from each of the $n$-stages of the storage register, first and second means effective to modify the amplitude of each said analogue signal by respective weighting factors $f_1, f_2, f_3 \ldots f_n$ proportional to $\cos \theta$ and $\sin \theta$ respectively, where $\theta = 0, 2\pi/n$, $$2 \times 2\pi/n \ldots (n-1)2\pi/n$$

respectively, and respective summing means effective to sum the respective modified analogue electric signals to provide two respective outputs representative of the eccentricity of the mounting of the object relative to the axis of relative rotation.

References Cited

UNITED STATES PATENTS 3,259,989   7/1966   Wilson _____ 33—174 L

FOREIGN PATENTS 1,377,837   1964   France _____ 33—174 L

LEONARD FORMAN, Primary Examiner

P. G. FOLDES, Assisant Examiner

U.S. Cl. X.R.

33—174 P, 178 E